UNITED STATES PATENT OFFICE.

GOTTLIEB CHRISTOF ZIMMERMANN, OF STUTTGART, GERMANY.

PROCESS FOR MAKING A KOLA PREPARATION.

1,140,934.

Specification of Letters Patent. Patented May 25, 1915.

No Drawing. Application filed June 27, 1914. Serial No. 847,774.

*To all whom it may concern:*

Be it known that I, GOTTLIEB CHRISTOF ZIMMERMANN, a citizen of the German Empire, residing at Stuttgart, in the Kingdom of Wurttemberg, Germany, have invented certain new and useful Improvements in Processes for Making a Kola Preparation; and I do hereby declare the following to be a full, clear, and exact description of the invention, such as will enable others skilled in the art to which it appertains to make and use the same.

My invention relates to a process for making a kola preparation for use as food.

It has already been proposed to make a long lasting preparation of the well known kola fruit by roasting the fresh (not yet dried) kernel of the fruit that may have been kept in store for a shorter or longer time, in order to remove its bitter taste that makes it nauseating to civilized people. Apart from the fact that the purpose intended is not obtained by this roasting of the kola fruit, moreover a great part of the alkaloids (caffein and a little theo-bromin) contained in the fresh fruits are converted from the bound form into the free one, in which they are by far less valuable. In the heretofore known preparations of kola the special qualities of the fresh kola fruit (namely, the stimulating and refreshing effect) are lost on account of the fact that the kola nuts were roasted. In applicant's process the roasting is entirely done away with. This conversion of the alkaloids from the bound form into the free one is prevented in the new process in which the fresh fruit which is cut into pieces is left to ferment in its own sap for some time. By this treatment the other advantage is obtained that the fruit loses its disagreeable bitter taste due to the volatile oils, that are volatilized hereby.

In executing the new process, the fresh kola fruits that may have been kept in store for some time, if they do not lose their freshness thereby, are at first cut into pieces and are in this condition put into stores for 3-6 days, depending on the condition of the fruits, and left to ferment in their own sap. The product obtained is then subjected in known manner to a roasting process at a temperature of about 180-200 degrees C. for so long a time that the small kola pieces are completely roasted. The preparation obtained in this manner shows a mild, aromatic flavor and in its effect differs in no manner from the fresh fruit; but contrary to the fresh fruit it lasts without special treatment for years.

The kola preparation may be used in any convenient manner; for instance it may be boiled in hot water and the liquor obtained may be mixed with sugar and thickened; but of course the kola extract, gained by boiling in water might also be used immediately as a beverage in a similar manner to coffee, tea or the like.

I claim:

A process for making a kola preparation consisting in cutting the fresh fruits to pieces, leaving them to ferment and then roasting the product obtained at a temperature of 180-200 C.

In testimony whereof I affix my signature, in presence of two witnesses.

GOTTLIEB CHRISTOF ZIMMERMANN.

Witnesses:
 GEORG HANSELMANN,
 FRIDA KLAIBER.